Dec. 14, 1971  M. P. BEAUVAIS  3,627,477

APPARATUS FOR STERILIZING PRODUCTS

Filed March 13, 1970  2 Sheets-Sheet 2

INVENTOR
MAX P. BEAUVAIS

United States Patent Office 3,627,477
Patented Dec. 14, 1971

3,627,477
APPARATUS FOR STERILIZING PRODUCTS
Max P. Beauvais, Paris, France, assignor to Reynolds
Metals Company, Richmond, Va.
Filed Mar. 13, 1970, Ser. No. 19,422
Claims priority, application France, Apr. 25, 1969,
6913216
Int. Cl. A61l 3/00
U.S. Cl. 21—80                                8 Claims

ABSTRACT OF THE DISCLOSURE

An apparatus for sterilizing products placed within a closable vessel. The products to be sterilized are packed within containers which are themselves placed within and carried by the closable vessel. The latter is partially filled with a suitable liquid which is then vaporized and the vapor pressure used to close the vessel. Conveyor means feed the vessel intermittently and sequentially through loading, vaporizing, heat-maintaining, cooling, and unloading stations.

---

The present invention relates to an apparatus for sterilizing products and more particularly to an apparatus for sterilizing products such as foodstuffs or pharmaceutical products.

At the present time products must be sterilized either in an autoclave, which is capable of handling only small quantities of products in a batch operation, and vast installations which can be made to be economical only if large quantities of products are treated.

It is the purpose of the present invention to provide an apparatus which permits treatment in a substantially continuous manner of a moderate quantity of products. This is achieved by employing a series of closable vessels which contain the products to be sterilized. By partially filling each closable vessel with a suitable liquid, such as water, which may be vaporized and thereby provide a suitable force for closing the vessel, it becomes possible to fill, heat and cool products within the vessels which are transported on a continuous conveyor means.

The sterilizing vessel itself preferably is provided with a door which opens inwardly and which is so arranged as to be kept tightly closed by the vapor pressure of the liquid deposited within the container. That is, the vapor pressure exceeds the ambient pressure whereby the sterilizing vessel may be closed and maintained closed during the cooking cycle without the intervention of a human hand after the apparatus has been started.

The invention is particularly suitable for sterilizing products contained within flexible pouches such as those made from laminates of aluminum and plastic materials. By inserting the pouches within the sterilizing vessel, the environment is such that the pouches are relatively protected from bursting and are handled gently whereby there is little likelihood that the seam will rupture.

The description which follows is made with reference to the drawings and is advanced for purposes of illustration and not intended to be limiting in nature. Accordingly, reference is made to the drawings in which.

Figure 1:
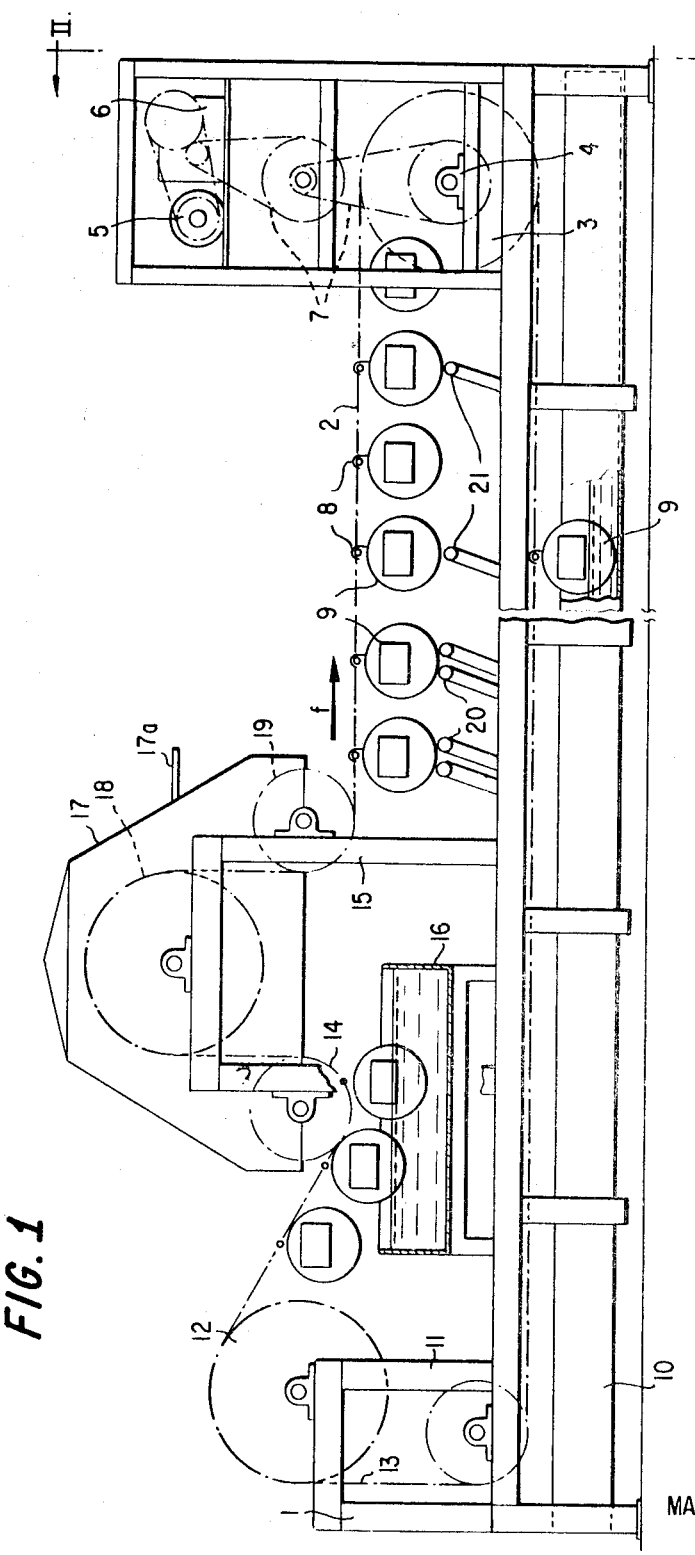
FIG. 1 is a diagrammatical view in front elevation of one apparatus embodying the present invention.
Figure 2:
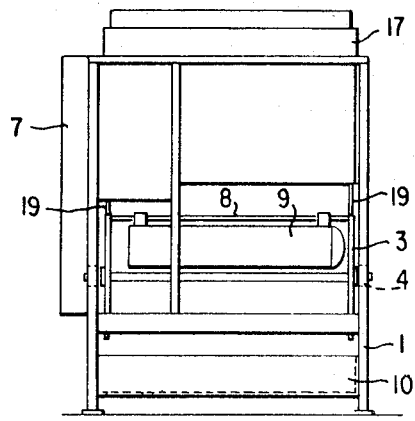
FIG. 2 is an end elevational view as seen from along the line designated II of FIG. 1.

Referring now to FIGS. 1 and 2 of the drawings, there is illustrated an elongated frame 1 on which are mounted conveyor means which comprise two parallel conveyor chains 2 driven by a power drum 3. The latter is rotatably mounted in bearings 4 located at one of the ends of the frame.

For purposes of effecting a satisfactory reduction in the drive velocity, the drum 3 is operated by a motor 5 through the intermediary of an intermittently acting drive mechanism 6 and of a reducing transmission 7, all of which are shown in FIG. 1.

The conveyor chains 2 are interconnected serially by equidistant cross members 8 on which an individual sterilization vessel 9 is suspended and which will be described more fully hereinafter. After the sterilizing vessels 9 pass over drum 3 they are immersed in a cooling tank 10 provided at the lower portion of frame 1. The level of the water in vessel 9 as it passes through cooling tank 10 is preferably maintained below the opening in the vessel 9 whereby an overriding pressure may be maintained on the containers therein. Thereafter, the chains are provided with a vertical upward section at 13 which constitutes a convenient loading and unloading station in which the vessels 9 are attached to and removed from the pair of conveyors 2.

After the sterilizing vessels 9 have been attached to the pair of conveyor chains 2, they pass under idler gears 14 in the course of which they are partially immersed in a vat or tank 16. The idler gear 14 is so positioned with respect to the upper surface of the liquid contained in tank 16 that the sterilizing vessels 9 are partially filled with the liquid in tank 16. Any suitable means, not shown, may be employed to replenish and thereby to maintain the level of the liquid in tank 16 at a constant elevation. The sterilizing vessels 9 are then passed beneath a hood 17 in the course of which vessels 9 pass around idler gears 18 and 19. A steam atmosphere is admitted beneath hood 17 by suitable means such as by conduit 17a whereby the vessels 9 are heated in order to raise the temperature of the liquid in vessels 9 toward its vaporization temperature. As the sterilizing vessels 9 leave idler gear 19 they are at a height such that they pass along an extended horizontal path at the end of which they pass over drum 3.

During this horizontal movement of sterilizing vessels 9, the sterilizing vessels 9 come into the immediate influence of a series of heating stations 20 and 21. It will be observed that at heating stations 20 double gas burners are employed spaced by an interval or increment which corresponds with the spacing of the individual heat sterilizing containers 9 on the conveyor chains 2. Heating stations 20 are followed by a series of heating stations 21 which are spaced apart by twice the interval of the spacing between adjacent sterilizing vessels 9 on the conveyor chains 2. The first section of heating stations 20 are intended to increase the temperature within vessels 9 above the boiling point of water while the second set of stations 21 are used merely to maintain the temperature at a desired point. It will be apparent that any number of burners may be used in the heating stations 20 and 21 so as to attain the desired temperature cycle.

The design shown in FIG. 1 is such that the intermittent advance of the conveyor chain 2 in the direction of the arrow $f$ shown in FIG. 1 is such that the containers are intermittently stopped in registry with the heating stations 20 and in alternate advances with heating stations 21.

Figure 4:
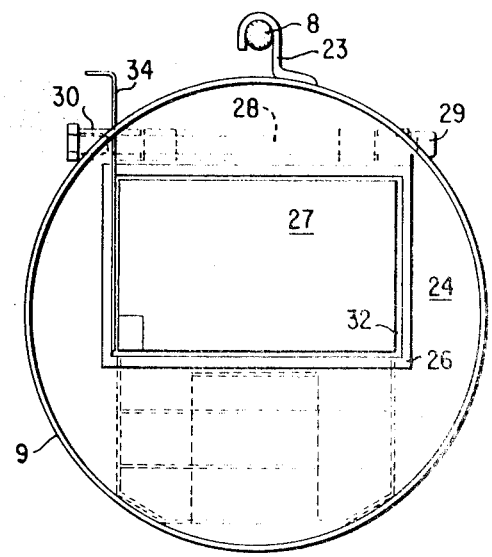
Figure 3:
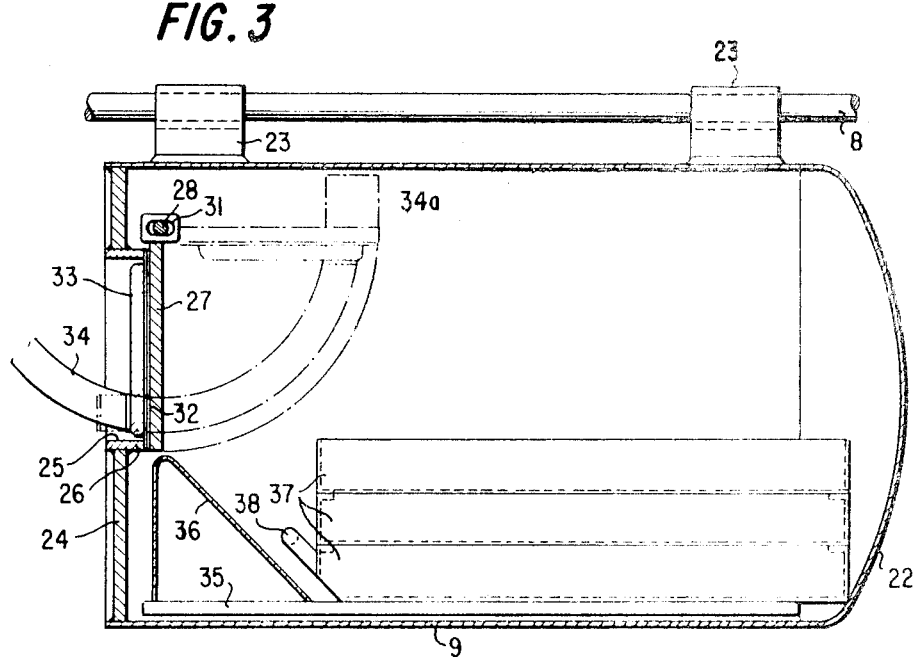
FIG. 3 is an elevational view in vertical cross section of an individual sterilizable container; and, FIG. 4 is a front end view of the sterilization container of FIG. 3.

Referring now to FIGS. 3 and 4, each sterilization vessel 9 is formed by a cylindrical tube closed at one end by a dish-shaped head 22. Each vessel is provided at its exterior top surface with a pair of hooks 23 located in line so as to permit the suspension of a sterilization vessel 9 in a substantially horizontal plane laterally between conveyor chains 2 by means of one of the cross members 8. Therefore, the total length of each vessel is less than the distance between the chains of the conveyors. The vessel 9 is closed by a flat end wall 24 in which a rectangular opening 25 is provided outlined by a flange 26 which projects into the tube.

As shown in FIGS. 3 and 4, the opening 25 lies in a horizontal plane when the tubular vessel 9 is suspended by hooks 23. The lower edge of opening 25, as seen in FIG. 3, is located slightly below the horizontal diameter of the sterilizing vessel 9. A door 27 is provided behind the opening 25 and flange 26 with the door being hinged on a pin 28 mounted in sleeves 29 and 30 secured to the wall of the sterilizing vessel 9.

Pivotal mounting of the door at 27 on the pin 28 is effected by means of elongated eyes or slots 31 (FIG. 3) which permits a certain lateral movement in the horizontal direction of the door in order that the sealing gasket 32 may contact the rearward surface of flange 26. In addition, door 27 is balanced in such a manner that it is able to maintain the pressure within the container by virtue of its tight seal with the flange 26 in order to avoid any leakage of air and loss of pressure from within the vessel 9.

A handle 34 is secured to the outer face of the door to facilitate opening and closing the latter. An abutment 34a may be provided within the container to limit the extent to which the door may be opened (FIG. 3).

The sterilizing container 9 includes at the lower portion thereof two guide rods 35 which are rigidly connected to an inclined plane 36 located behind the lower edge of flange 26. These rods and the inclined plane are designed to receive trays 37 on a rack in which are placed the products to be sterilized, wrapped for example in flexible aluminum pouches or the like.

In the present embodiment three trays are piled on each other with a lower tray having a polygonal bottom such that it corresponds to the shape of the container and is provided with a grip or handle 38. The trays are staggered in their arrangement. Preferably they do not extend above the level of the lower edge of opening 25.

When the sterilizing vessel 9 arrives at the vertical portion 13 of the conveyor chains 2, it is possible either to unload it and replace it with another or to empty the products contained therein and replace them by other products within containers.

While presently preferred embodiments of the invention have been illustrated and described, it will be recognized that the invention may be otherwise variously embodied and practiced within the scope of the claims which follow.

What is claimed is:

1. An apparatus for sterilizing products placed within a closable vessel comprising
   (a) a closable vessel for containing products packaged in containers carried within said vessel,
   (b) means for partially filling said vessel with a liquid,
   (c) means for closing said vessel by expansion of said liquid within said vessel upon the application of heat to said vessel,
   (d) a plurality of heating stations adapted to maintain said closable vessel heated,
   (e) and conveyor means for feeding said closable vessel through said heating stations.

2. Apparatus for sterilizing products placed within a closable vessel as defined in claim 1 wherein said liquid substantially covers said containers carried within said vessel.

3. Apparatus for sterilizing products placed within a closable vessel as defined in claim 1 including means for partially filling said vessel with cold water to cover and cool containers within said vessel, thereby maintaining an overriding pressure on said containers.

4. Apparatus for sterilizing products placed within a closable vessel as defined in claim 1 wherein said conveyor means is driven intermittently and wherein said heating stations are so positioned so as to be closely adjacent one of said vessels when said vessel is stopped during its intermittent feed.

5. Apparatus for sterilizing products placed within a closable vessel as defined in claim 4 wherein said means for feeding said closable vessels intermittently include a pair of parallel chain conveyors and means for suspending a plurality of said closable vessels laterally therebetween.

6. Apparatus for sterilizing products placed within a closable vessel as defined in claim 1 wherein said means for partially filling said vessel with a liquid includes an open tank through which each closable vessel is passed.

7. Apparatus for sterilizing products placed within a closable vessel as defined in claim 1 wherein said means for closing said vessel includes a hood through which said vessel passes and into which is admitted a steam atmosphere.

8. Apparatus for sterilizing products placed within a closable vessel as defined in claim 4 wherein said pair of conveyors each comprise a closed loop circuit.

References Cited
UNITED STATES PATENTS

| | | |
|---|---|---|
| 1,015,847 | 1/1912 | Shields. |
| 1,215,682 | 2/1917 | May. |
| 2,373,620 | 4/1945 | Vischer. |
| 3,147,068 | 9/1964 | Castle et al. _____ 21—91 X |
| 3,246,947 | 4/1966 | Castle _____ 21—91 X |

MORRIS O. WOLK, Primary Examiner

J. T. ZATARGA, Assistant Examiner

U.S. Cl. X.R.

21—91, 94; 99—214, 215, 216